United States Patent [19]
Landstrom et al.

[11] Patent Number: 6,047,694
[45] Date of Patent: Apr. 11, 2000

[54] COOKING ENHANCEMENT SYSTEM WITH FIRE RETARDING AND STEAMING MEANS

[76] Inventors: Peter H. Landstrom, 3055 Highway E, Bailey's Harbor, Wis. 54202-9228; Thom Carpenter, 1185 Jansen Farm Ct., Elgin, Ill. 60120

[21] Appl. No.: 09/317,520

[22] Filed: May 24, 1999

Related U.S. Application Data

[60] Provisional application No. 60/086,445, May 22, 1998.
[51] Int. Cl.[7] .................................................. F24B 3/00
[52] U.S. Cl. .................. 126/25 C; 126/25 R; 126/41 R; 126/299 E; 169/65; 99/345
[58] Field of Search ................................ 126/25 R, 25 C, 126/41 R, 299 E; 169/13, 61, 65; 99/345

[56] References Cited

U.S. PATENT DOCUMENTS

| | | | |
|---|---|---|---|
| 5,353,880 | 10/1994 | Green | 126/41 R |
| 5,511,535 | 4/1996 | Landstrom et al. | 126/25 C |

*Primary Examiner*—Carroll Dority
*Attorney, Agent, or Firm*—Michael R. McKenna

[57] ABSTRACT

This invention relates to a cooking enhancement system for retarding excessive flame and creating a burst of spray to steam a product being cooked with an automatic means for distributing water onto an excessive flame activated by a photodetector that senses light from the excessive flame.

20 Claims, 8 Drawing Sheets

REMOTE CONTROL

COOKING ENHANCEMENT SYSTEM WITH FIRE RETARDING AND STEAMING MEANS

This application is based on applicant's provisional application Ser. No. 60/086,445 filed May 22, 1998.

BACKGROUND OF THE INVENTION

The applicants earlier invention relating to an improved barbecue grill having a means for retarding an excessive flame which may be produced during the cooking process and incorporating a means for sensing light from the flame and responding to it with the distribution of a fluid fire suppressant to retard the excessive flame is set forth in U.S. Pat. No. 5,511,535.

Various other modes of fire suppression are reflected in the specification thereof and will not be repeated here.

The cooking enhancement system of the present invention teaches a system comprising means for distributing a fluid for steam generation to enhance the moisture of cooked meat and other cooked products.

The system includes a control for selectively activating the delivering means to deliver a supply of fluid. The control includes means for sensing light that is optically accessible to and operably responsive to the light from a flame produced during the cooking process for indicating a flame condition, timer means for intermittently indicating a desired spray condition, and switch means operatively connected to the sensing means and the timer means for activating the delivering means responsive to a flame condition and a desired spray condition to periodically develop a burst of spray to steam a product being cooked by the cooking system.

ADVANTAGE OF THIS INVENTION

An advantage of this invention is that an automatic steaming cycle results to reduce charring and burning of grilled products and produces healthier eating. It tends to keep meats juicy and tender for extended grilling periods which is especially significant with recent advisories to cook meats well. The circuit may be designed to limit pump running time to about two seconds per cycle. This prevents drowning of the burner element during flare-up control and also when the auto-steam and manual override functions are employed. This also limits steam build-up in the grill.

It is designed to operate with an existing standard cooking system not limited to barbecue grills.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

This invention relates to a cooking enhancement system comprising means for distributing a fluid for steam generation having a distribution member disposed proximate the cooking space and at least one discharge nozzle directed generally toward the cooking space. Means for controllably delivering a supply of fluid to the distribution member to be discharged from the nozzle is also provided. Furthermore, the system includes a control for selectively activating the delivering means to deliver a supply of fluid.

The control includes means for sensing light that is optically accessible to and operably responsive to the light from a flame produced during the cooking process for indicating a flame condition, timer means for intermittently indicating a desired spray condition, and switch means operatively connected to the sensing means and the timer means for activating the delivering means responsive to a flame condition and a desired spray condition to periodically develop a burst of spray to steam a product being cooked by the cooking system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

A cooking enhancement system, for use with a cooking system disposed in a cooking space that employs a flame is disclosed herein. The cooking system comprises means for distributing a fluid for steam generation having a distribution member disposed proximate to the cooking space and at least one discharge nozzle directed generally toward the cooking space. Means for controllably delivering a supply of fluid to the distribution member to be discharged from the nozzle is also provided. Furthermore, the system includes a control for selectively activating the delivering means to deliver a supply of fluid.

The control includes means for sensing light that is optically accessible to and operably responsive to the light from a flame produced during the cooking process for indicating a flame condition, timer means for intermittently indicating a desired spray condition, and switch means operatively connected to the sensing means and the timer means for activating the delivering means responsive to a flame condition and a desired spray condition to periodically develop a burst of spray to steam a product being cooked by the cooking system.

In a preferred embodiment of the present invention, the flame arises from beneath a cooking surface.

Figure 8:
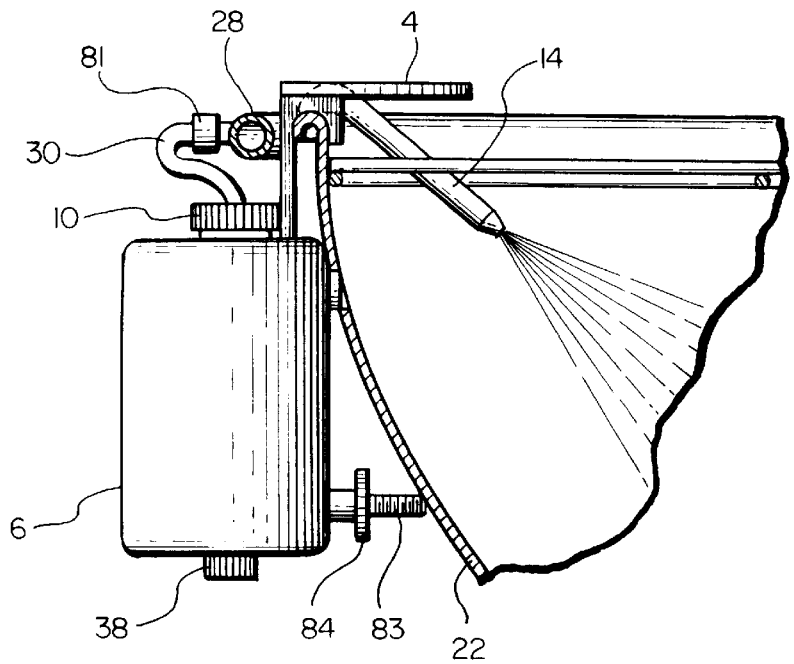
FIG. 8 is an enlarged partial sectional elevation view illustrating a preferred embodiment of the invention showing the horizontal distribution ring disposed outside of the kettle with the nozzles emanating upwardly from the horizontal distribution ring.

Referring to FIG. 8, preferably the distribution member is generally horizontal and disposed outside of the cooking space, and further comprising means for maintaining a quantity of water in the generally horizontal distribution member.

In a preferred embodiment of the present invention, the means for distributing a fluid provides flame suppression. In such embodiment, the at least one discharge nozzle is directed generally toward the flame.

Preferably, the means for sensing light is optically accessible to and operably responsive to the light from an excessive flame produced during the cooking process for indicating an excessive flame condition, and the switch means is operatively connected to the sensing means and the timer means for activating the delivering means responsive to at least one of an excessive flame condition and a desired spray condition. In this way, an excessive flame may be doused. Moreover, a burst of spray to steam a product being cooked by the cooking system may be periodically developed.

Additionally, the distribution member can be generally horizontal and disposed outside of the cooking space, and further comprising means for maintaining a quantity of water in the generally horizontal distribution member.

In a preferred embodiment of the present invention, the timer means includes means for adjusting the time delay between flame detection and initial discharge of fluid.

In another preferred embodiment of the present invention, the timer means includes means for selecting a plurality of time intervals between spray times. Moreover, the timer means may include a selector switch for selectively connecting one of a plurality of resistors to a timer circuit. These resistors have different values corresponding to the time intervals.

Another preferred feature of the cooking enhancement system shows the timer means having means for determining duration of spray time. Specifically, the timer means may include a potentiometer operatively connected to a timer circuit for varying duration of spray time.

In a preferred embodiment of this invention, the timer means includes an automatic steam setting having a predetermined duration of spray time and a predetermined time interval between sprays.

Preferably, the timer means includes a first timer circuit for determining interval between spray times and a second timer circuit for determining duration of spray time. A potentiometer operatively connected to a timer circuit may be employed for varying duration of spray time. Additionally, a selector switch may be included for selectively connecting one of a plurality of resistors to a timer circuit, where the resistors have different values corresponding to the time intervals.

Figure 1:
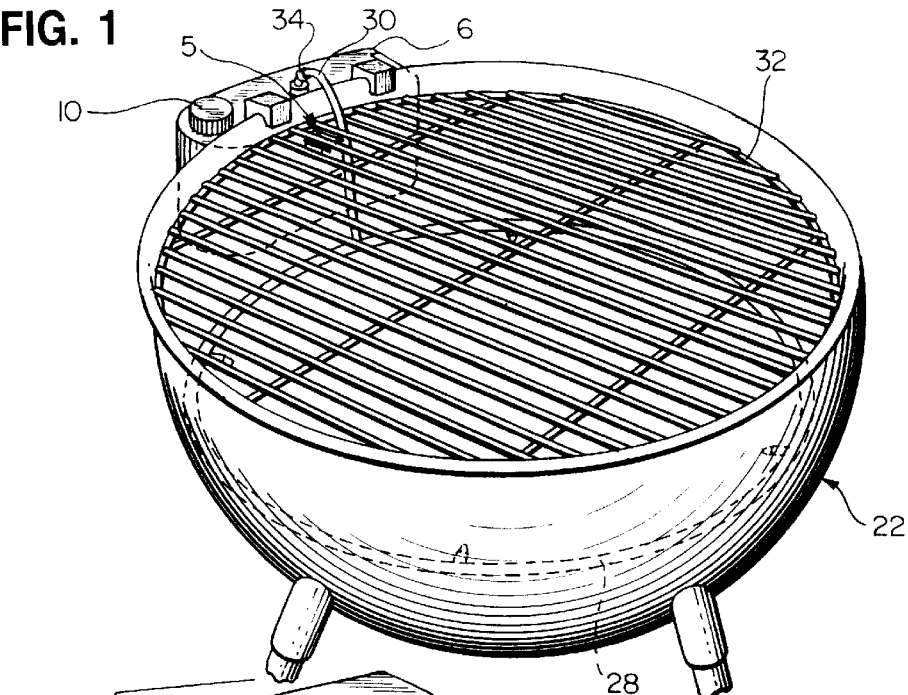
FIG. 1 is a perspective view of a first preferred embodiment of the present invention showing a means for retarding excessive flame positioned relative to the kettle.

Referring to FIG. 1, the delivering means may comprise a pump operatively connected between a fluid reservoir and the distribution member. Alternatively, a high pressure water supply line may be operatively connected to the distribution member.

In another preferred embodiment of the cooking enhancement system, for use with a cooking system disposed in a cooking space that employs a flame, of this important invention, elements are provided comprising means for distributing a fluid for flame suppression and steam generation having a distribution member disposed proximate to the cooking space and at least one discharge nozzle directed generally toward the flame, means for controllably delivering a supply of fluid to the distribution member to be discharged from the nozzle, and a control for selectively activating the delivering means to deliver a supply of fluid.

The control includes means for sensing light that is optically accessible to and operably responsive to the light from an excessive flame produced during the cooking process for indicating a flame condition, timer means for intermittently indicating a desired spray condition, and switch means operatively connected to the sensing means and the timer means for activating the delivering means responsive to a flame condition and a desired spray condition to douse an excessive flame and periodically develop a burst of spray to steam a product being cooked by the cooking system.

Preferably, the distribution member is generally horizontal and disposed outside of the cooking space, and it further comprises means for maintaining a quantity of water in the generally horizontal distribution member.

The discussion that follows, without limiting the scope of the invention, will refer to the invention as depicted in the drawing, showing a cooking system comprising an improved barbecue grill having a means for retarding excessive flame which may be produced during the cooking process. Coupled with a barbecue grill that has a kettle with an upper rim defining an opening into which a cooking fuel such as charcoal may be placed and ignited to produce a flame and a grill for supporting food, a means for distributing a fluid fire suppressant toward an excessive flame in the kettle is provided along with a means for activating comprising an electrical power source, and a means for sensing light from the excessive flame. The electrical power source is connected to power the means for distributing a fluid fire suppressant and the means for sensing light. When an excessive flame produced during the cooking process is sensed by the means for sensing light, it activates the means for distributing a fluid fire suppressant to discharge said fluid fire suppressant toward the excessive flame and thereby retard said excessive flame.

This invention resides not in any one of these features per se, but rather in the particular combination of all of them herein disclosed and claimed and it is distinguished from the prior art in this particular combination of all of its structures for the function specified.

In a preferred embodiment of the present invention, the cooking system comprises a barbecue grill that has a kettle with an upper rim that is arranged and adapted to hold cooking fuel which may be ignited in the bottom hollow thereof to produce a flame and has a grill for supporting food in a generally horizontal plane located in proximity to the upper rim and above the cooking fuel. Furthermore, the generally horizontal distribution member is disposed outside of the kettle.

Figure 2:
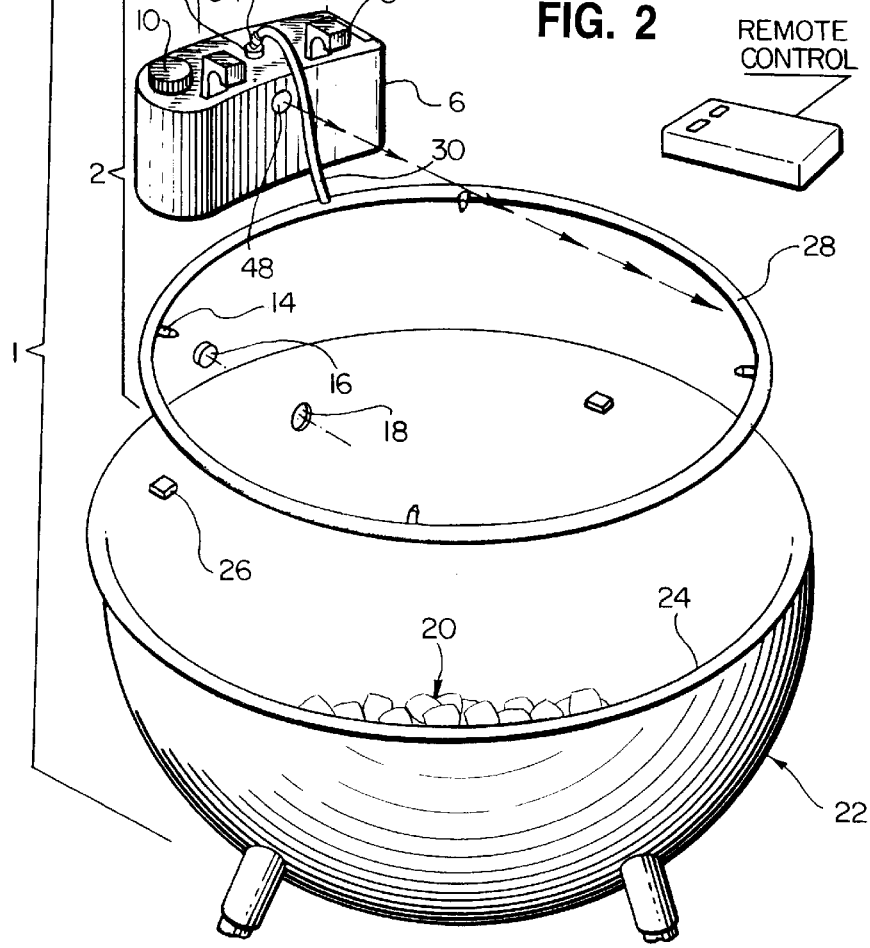
FIG. 2 is an exploded perspective view of a second preferred embodiment of the present invention with the components of its means for retarding excessive flame disengaged from the kettle.
Figure 7:
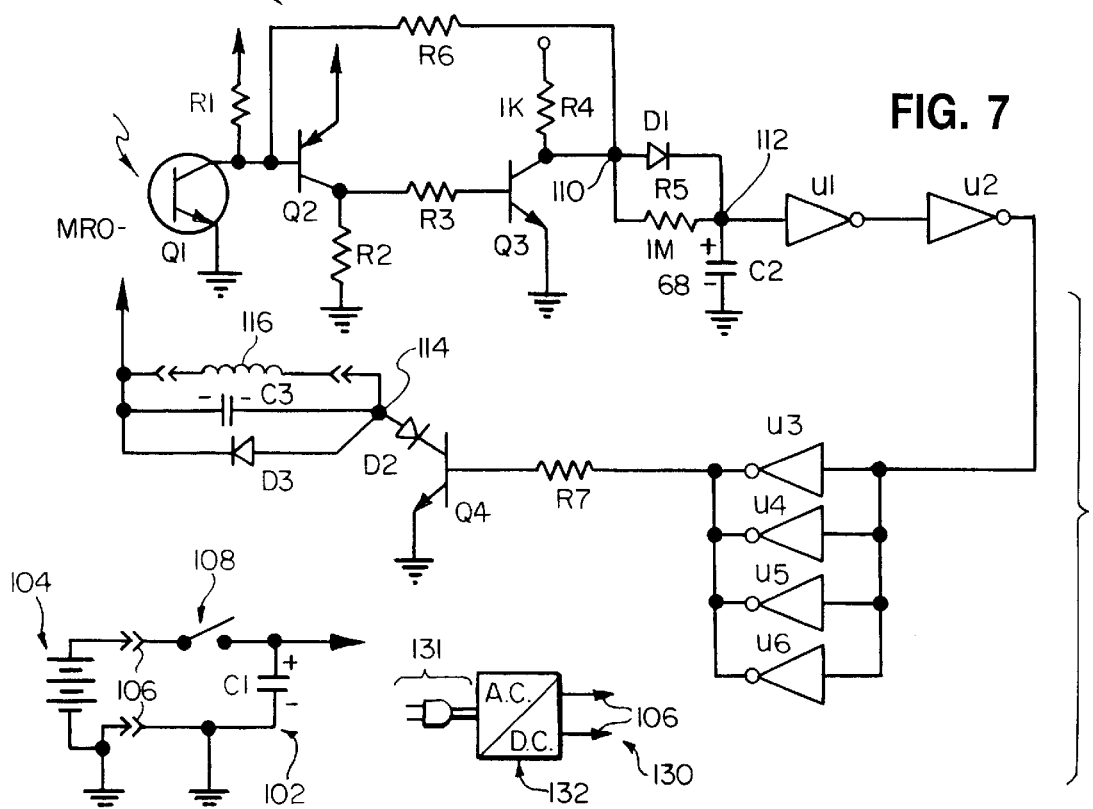
FIG. 7 is a circuit diagram illustrating a preferred embodiment of the invention showing the circuit operable to sense the existence of an excessive flame condition to turn on a pump (or solenoid valve) providing a spray of fluid fire retardant to douse the flame.

Referring to FIGS. 1 and 2, this invention relates to an improved barbecue grill 1 having a means for retarding excessive flame 2 which may be produced during the cooking process. Coupled with a barbecue grill that has a kettle 22 with an upper rim 24 defining an opening into which a cooking fuel such as charcoal 20, propane, or natural gas, may be placed and ignited to produce a flame and a grill 32 supported by a ledge 25 of the kettle for supporting food, a means for distributing a fluid fire suppressant, comprising a horizontal distribution ring 28, toward an excessive flame in the kettle 22 is provided along with a means for activating comprising an electrical power source, such as a battery 104, and a means for sensing light, such as a photodetector 50, from the excessive flame (See FIG. 5). Alternatively, the means for electrical power may comprise an a.c. power supply cord 131 and an a.c./d.c. transformer 132, collectively identified in FIG. 7 as 130, or a standard solar cell.

The battery 104, or other power source, is connected to power the means for distributing a fluid fire suppressant, such as a pump 12, and the photodetector 50. When an excessive flame produced during the cooking process is sensed by the photodetector 50, it activates the pump 12 to discharge the fluid fire suppressant toward the excessive flame and thereby retard said excessive flame.

The horizontal distribution ring 28 has at least one discharge nozzle 14 that is accessible to and directed generally toward the flame in the kettle 22. The photodetector 50, or other means for sensing light, is optically accessible to the light from the excessive flame produced during the cooking process and it operably responds by signalling the means for activating. The means for activating comprises a means for electrical power, such as a battery 104 which is operably connected to power the pump 12, or other means for distributing a fluid fire suppressant, such as a solenoid valve downstream of a pressurized water source, and the photodetector 50. In that way, an excessive flame produced during the cooking process that is sensed by the photodetector 50 activates the pump 12 to discharge the water from the water reservoir 9 through a pump discharge 35 to a supply line 30 toward the excessive flame and thereby retard said excessive flame.

In a preferred embodiment of the present invention, the means for sensing light comprises a circuit 100 that is operable to sense the existence of an excessive flame condition to turn on the pump 12 providing a spray of water to douse the flame. As shown in FIG. 8, the line of sight of the means for sensing may be adjusted by means for sensor adjustment comprising a screw 83 and an internally threaded base 84.

The circuit 100 includes a battery-operated power supply circuit 102. The power supply circuit 102 has a six (or twelve) volt battery 104 connected across terminals 106. An on/off switch 108 is connected in series with a filtering capacitor C1 across the terminals 106 to develop six (or twelve) volts power for supplying the remainder of the circuit 100. One skilled in the art could readily modify the circuit for a variety of power supply voltages to accommodated larger volume fire suppressant needs.

An excessive flame condition is sensed by a photodetector Q1 having an emitter connected to ground and a collector connected via a resistor R1 to the power supply circuit 102. The photodetector Q1 may be, for example, a Motorola type MRD701 photodetector with transistor output. The photodetector Q1 is switched on in response to sensed light being above a select level as determined by characteristics of the photodetector.

As an alternative to the photodetector Q1, an analog light sensing device could be used connected to a comparator for comparing sensed light to a user adjustable level, as would be apparent to those skilled in the art.

The collector of the photodetector Q1 is connected to the base of a PNP transistor Q2. The transistor Q2 has its emitter connected to supply. The collector of the transistor Q2 is connected via a resistor R2 to ground and via another resistor R3 to the base of an NPN transistor Q3, the emitter of which is connected to ground. The collector of the transistor Q3 is connected via a resistor R4 to supply and to a junction 110. The junction 110 is connected via a parallel combination of a diode D1 and a resistor R5 to a junction 112. A feedback resistor R6 is connected between the junction 110 and the base of the transistor Q2. The junction 112 is connected via a capacitor C2 to ground and to an inverter U1. The output of the inverter U1 is connected through a second inverter U2, which is in turn connected to four parallel inverters U3, U4, U5 and U6 acting as a buffer. The output of the inverters U3–U6 is connected via a resistor R6 to the base of an NPN transistor Q4 having its emitter connected to ground. The collector of the transistor Q4 is connected through a diode D2 to a junction 114. Connected in parallel between the junction 114 and supply are a pump motor winding 116, a capacitor C3 and a diode D3.

During a normal state, when no flame is being sensed, the photodetector Q1 is off so that the transistors Q2, Q3 and Q4 are off, and the pump motor winding 116 is de-energized. With the transistor Q3 off, the supply is connected through the resistor R4 and the diode D1 to charge the capacitor C2. Thus, the junction 112 is charged to the six (or twelve) volt supply level.

When an excessive amount of light is detected by the photodetector Q1, it turns on, thus turning on the transistor Q2 to in turn turn on the transistor Q3. When the transistor Q3 is turned on, the capacitor C2 discharges through the resistor R5 and the transistor Q3 to ground. This provides a time delay to prevent pump turn on in the event that only a momentary flame is sensed. As the voltage across the capacitor C2 drops, the output of the first inverter U1 goes high, causing the output of the second inverter U2 to go low, which in turn causes the output of the buffer inverters U3–U6 to go high, turning on the transistor Q4. The circuit uses the four inverters U3–U6 to provide sufficient current for driving the transistor Q4. The inverters U1 and U2 are used to square up the signal at the junction 112.

When the transistor Q4 is turned on, the pump 116 is connected between supply and ground to energize the pump 116 and thus commence a spray of water. The capacitor C3 and diode D3 act as a filter to stop inductive spikes and as a clamp to protect from positive voltage spikes. The diode D2 protects from reverse spikes.

As is apparent, the spray of water should quickly douse the flame. Once the flame is doused, the transistor Q1 is turned off so that once the capacitor C2 is charged a sufficient level, the pump motor winding 116 is de-energized. Because the capacitor C2 is charged through the 1K resistor R4, the charge time is virtually instantaneous.

In another preferred embodiment, the circuit may comprise a timing means disposed between said switching means and said sensing means for delaying switching of said switching means a select time duration after sensed light is above the select level to prevent pump turn on if only a momentary flame is sensed.

In another preferred embodiment, the use of photovoltaic cells selenium barrier-layer which are of the self-generating type, with spectral sensitivity chiefly in the visible and near-ultraviolet regions may be employed.

In another preferred embodiment shown in FIGS. 12–15, another control circuit 200 which is operable to control operation of the pump 12 providing a spray of water to douse the flame or steam the product being cooked.

An automatic steaming cycle reduces charring and burning of grilled products and produces healthier eating. It tends to keep meats juicy and tender for extended grilling periods which is especially significant with recent advisories to cook meats well. The circuit may be designed to limit pump running time to about two seconds per cycle. This prevents drowning of the burner element during flare-up control and also when the auto-steam and manual override functions are employed. This also limits steam build-up in the grill.

The spray burst time can be adjusted by a potentiometer (POT) control mounted on the control panel. A second POT control adjusts sensor response time when flare-ups are present. This adjustment allows immediate or delayed pump activation when a flare-up is detected. Adjustment allows immediate or delayed pump activation when a flare-up is detected. The auto-steam function is preset to engage at various pre-selected intervals.

This system allows grill operation at higher temperature settings without concern. The system treats fire as a natural ally in the grilling process and does not try to defeat it but instead strategically controls it. Whatever temperature settings are selected, the system will control flare-ups, and keep foods moist and tender in the process. For example, when grilling on high heat, the auto-steam function may be used to provide additional moisture to the food. Moreover, a manual override switch may be initiated occasionally for quick bursts of moisture. Conversely, if you wish to char steaks or blacken fish fillets, you can grill on hot with the system off to achieve proper effect and then turn on the system to promote a moist, tender, finished product. The auto-steam function can be used with or without flavoring additives. The use of fresh water alone will produce excellent results.

Flavorizers add a custom touch to the foods being grilled. There are two types of flavorizers: liquid-smoke and savory. In addition to producing a natural smoke flavor, liquid smokes (hickory-mesquite) also impart a pleasing, golden color to grilled chicken and other products. Savory flavorizers are not smoked based and are available in a variety of flavors (teriyaki, etc.). A good starting point is 5 ounces of flavorizer to three quarts of water. All other seasonings should be applied directly to the food and not into the reservoir.

In cold-weather grilling situations, the reservoir should be filled and drained immediately before and after use.

Figure 12:
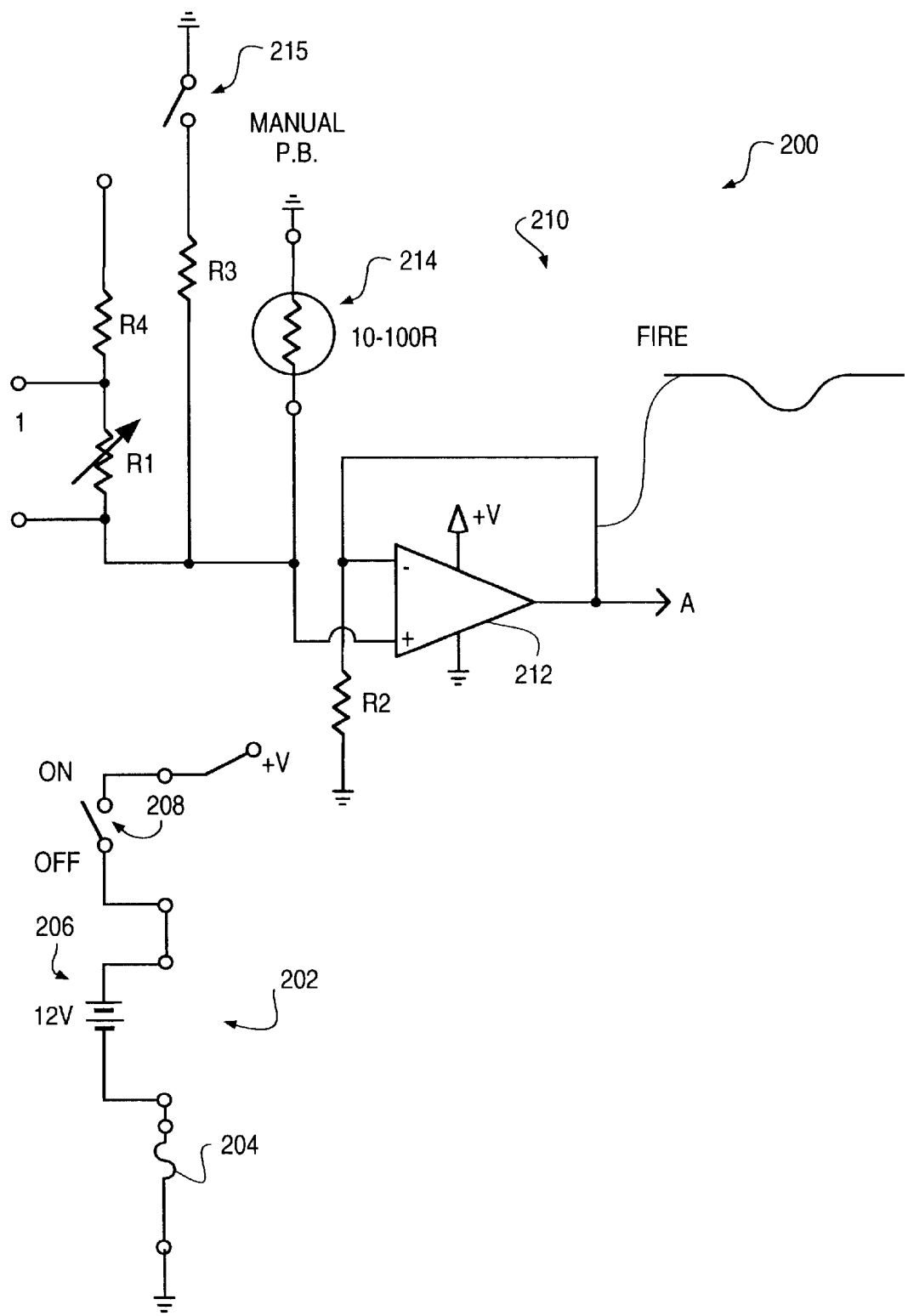
FIG. 12 illustrates a control circuit 200 according to a preferred embodiment of the invention for flame suppression and steam generation.

Referring initially to FIG. 12, the control circuit 200 includes a power supply circuit 202 including a series connected fuse 204, twelve volt battery 206, and on/off switch 208. When the on/off switch 208 is closed, the battery voltage is supplied to a +V terminal used throughout the rest of the circuit 200.

A fire detection circuit 210 uses an operational amplifier 212 and a photocell 214. The photocell 214 may comprise, for example, a Silonex Model NSL-5150 photocell. The photocell's resistance decreases with flame or with light. Change in resistance decreases the voltage at a positive input terminal of the operational amplifier 212. A series resistor R4 and potentiometer R1 are also connected to the positive input of the operational amplifier 212. The potentiometer resistance is varied to adjust sensitivity. The output of the operational amplifier 212, designated "A", goes low, as illustrated, when a flame is present. A manual push button 215 in parallel with the photocell 214 is used to manually initiate pump operation.

Figure 13:
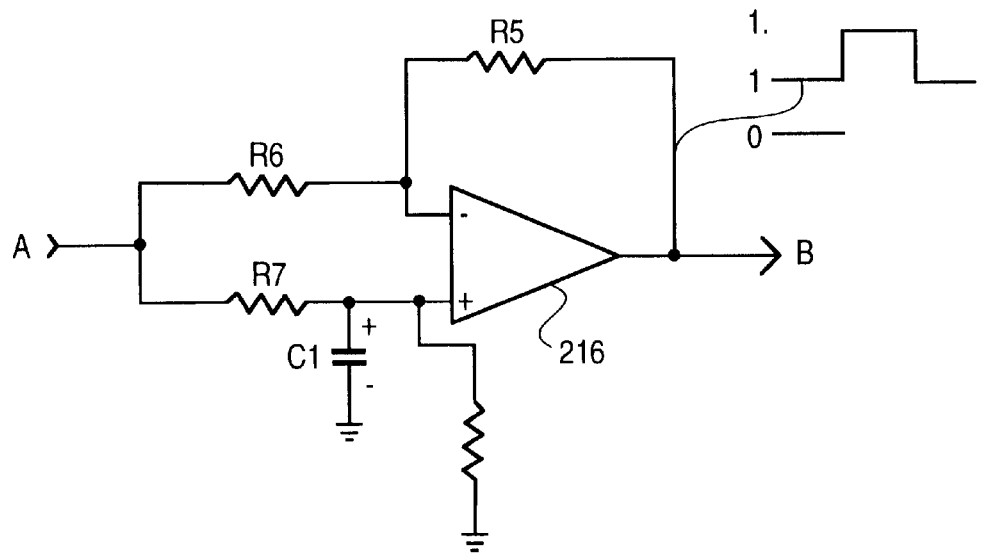
FIG. 13 shows further detail of the control circuit of FIG. 12 showing output A as the inputs of a second operational amplifier, elements creating an RC time constant, as opposed to the negative input which has no time constant, and the output of said second amplifier.

Referring to FIG. 13, the output A is applied to both the negative and positive inputs of a second operational amplifier 216 via respective resistors R6 and R7. A capacitor C1 is also connected to the positive input. The resistor R7 and capacitor C1 create an RC time constant, as opposed to the negative input which has no time constant. Because the negative input has no time constant and the positive input has a time constant, the output of the amplifier 216, labeled "B", switches immediately to a positive level, near the level of the power supply. As the capacitor C1 charges and the positive input voltage approaches the negative input voltage, the amplifier 216 will switch back to near zero level, or negative battery voltage. This circuit ignores changes due to ambient light.

Figure 14:
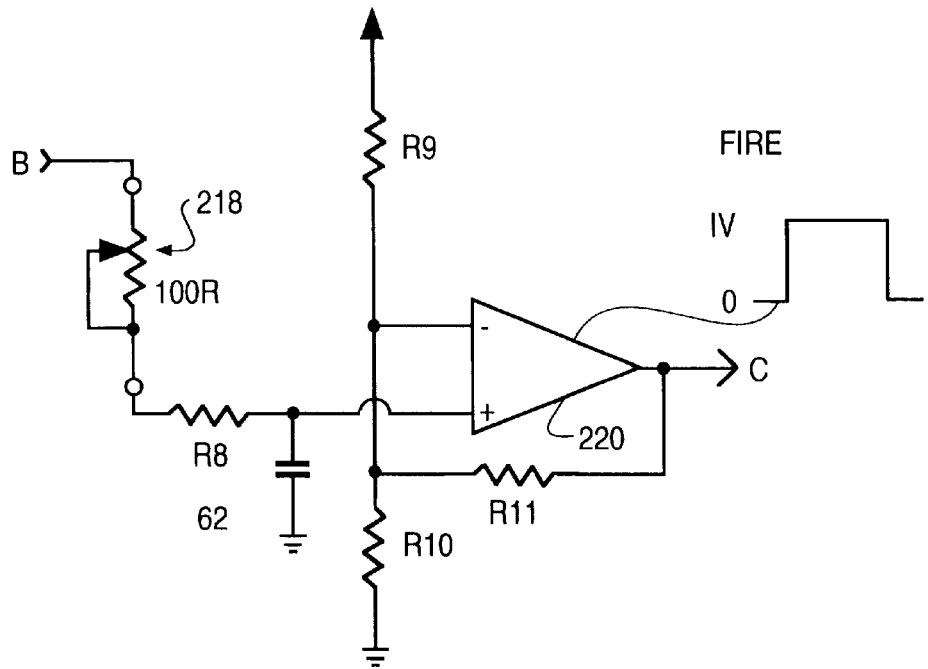
FIG. 14 shows further detail of the control circuit of FIG. 12 showing output B applied to create a delay in response to flare-up conditions, resulting in another operational amplifier developing an output C.

Referring to FIG. 14, the output B is applied through a potentiometer 218, a resistor R8 and capacitor C2 to a positive input of a third operational amplifier 220. This provides a delay in response to flare-up conditions. The fire must be present for a set time before the pump is turned on. The time is selected by varying the resistance of the potentiometer 218. The operational amplifier 220 develops an output, labeled "C", applied to the circuit of FIG. 15.

Figure 15:
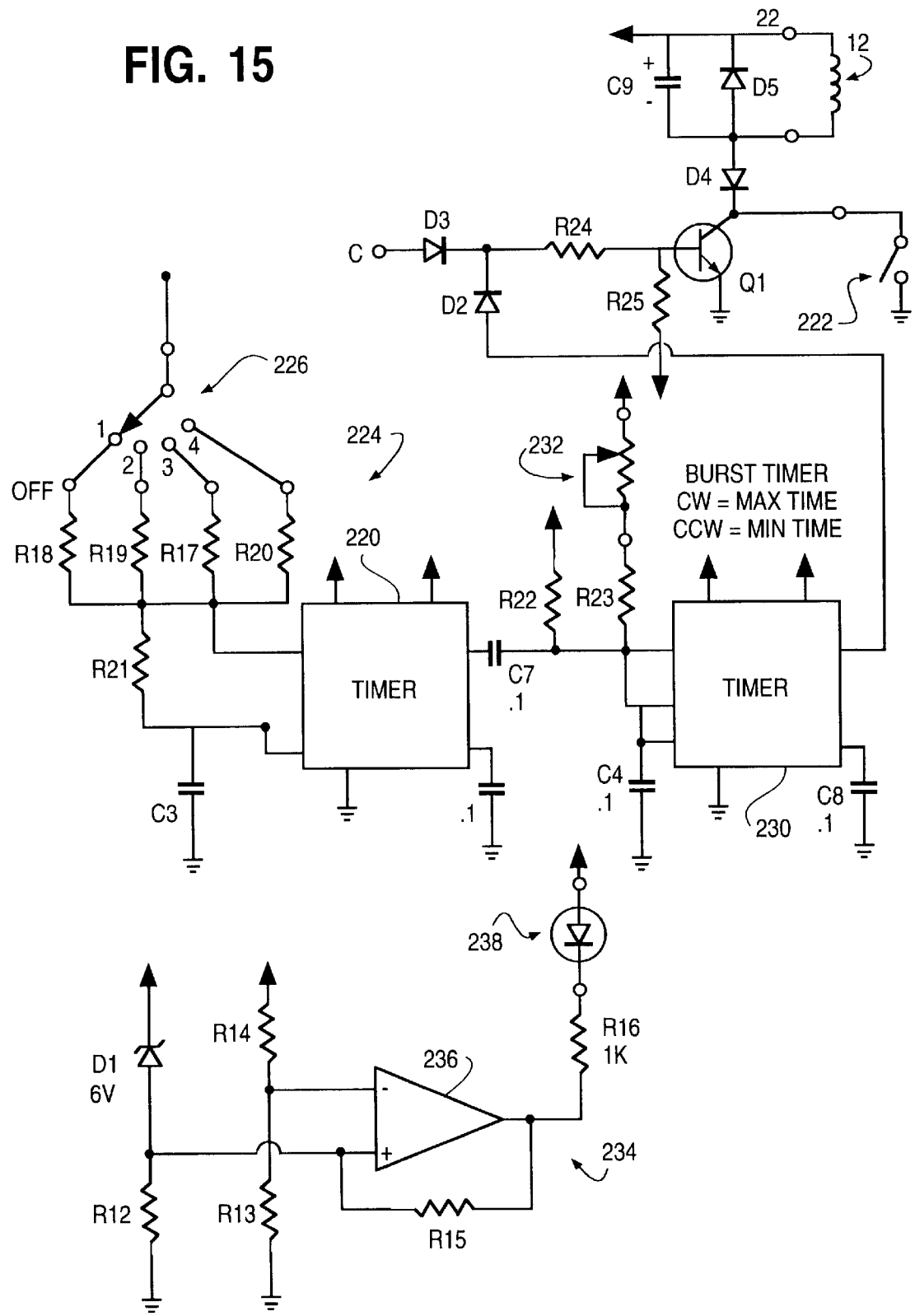
FIG. 15 shows further detail of the control circuit of FIG. 12 showing output C driving the base of a transistor to turn on a feed pump.

Referring to FIG. 15, the output C drives the base of a transistor Q1 through a diode D3 and resistor R24. The pump 12 is connected via a diode D4 to the collector of the transistor Q1. Thus, when the output C goes high, the pump 12 turns on. Returning again to FIG. 14, as the capacitor C2 charges up to the same level as the negative input of the amplifier 220, the output C goes low. This turns the transistor Q1 off to de-energize the pump 12.

An emergency override switch 222 is connected in parallel with the transistor Q1. This is used to directly energize the pump if necessary to provide a continuous spray of water.

A steam generating circuit 224 is also operable to selectively energize the pump 12. The steam circuit includes a five position selector switch 226. The selector switch 226 has an "off" position and four "on" positions. Contacts associated with the four "on" positions are connected via respective resistors R18, R19, R17 and R20 to a type 555 timer circuit 128. The values of the resistors R17–R20 are selected to provide desired period or interval between spray times. In the illustrated embodiment of the invention, the resistor R18 is 330kΩ to provide an eighteen second interval, the resistor R19 is 680kΩ to provide a thirty second interval, the resistor R17 is 1.5MΩ to provide a one minute interval, and the resistor R20 is 3.3MΩ to provide a two minute interval. The output of the timer circuit 228 is supplied to a second type 555 timer circuit 230. The second timer circuit 230 sets "on" time using a potentiometer 232. The output of the second timer circuit 230 is connected via a diode D2 to the junction between the diode D3 and the resistor R24. Thus, the circuit 224 is operable to create a periodic burst of spray to steam the product. The first timer circuit 228 sets the period or interval between spray cycles. The second timer circuit 230 sets the "on" time for the pump 12.

A low battery detector circuit 234 uses an operational amplifier 236 to determine if the battery voltage level is below approximately 7–8 volts, at which time an LED 238 is turned on.

In a preferred embodiment of the present invention as shown in FIG. 2, the kettle 22 has an aperture 18 positioned below the grill 32 and in proximity thereto which serves as a sight opening for the photodetector 50 or the other means for sensing light. For brevity in this description, I will refer to the means for sensing light as the photodetector 50.

As shown in FIGS. 1–4, the photodetector 50 is positioned outside of the kettle in proximity to the aperture. It is arranged to sense excessive flame in a generally horizontal planar region that includes line 7 passing through the aperture 18, below the grill 32 and in proximity thereto. (See particularly FIG. 2.) In a preferred embodiment, a sheet of translucent heat resistant material 16 is positioned in line with the aperture 18 in said kettle 22.

In the first preferred embodiment of the present invention as shown in FIG. 1, the means for sensing further comprises a means for shielding the photodetector from sunlight, such as the lip 5 shown in FIG. 1, positioned through the aperture 18 in the kettle 22 to prevent sunlight from interfering with the photodetector 50. In a second preferred embodiment, the means for shielding is shown in FIG. 2, as step 4 affixed to the top of the attachment hooks 8. Preferred features for the circuit under the contemplated operating conditions is that it would have a heat resistant coating and auxiliary fan cooling.

Figure 5:
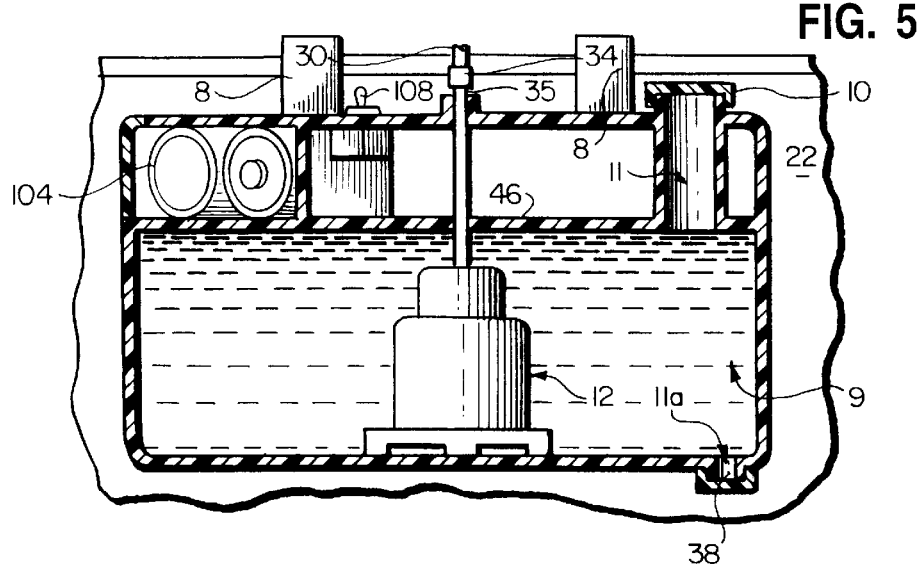
FIG. 5 is an enlarged sectional view taken along the line 5—5 of FIG. 4, showing details of the arrangement of components within full length of casing 6 (but excluding the sun shield 4 of FIG. 2) of the second preferred embodiment.
Figure 6:
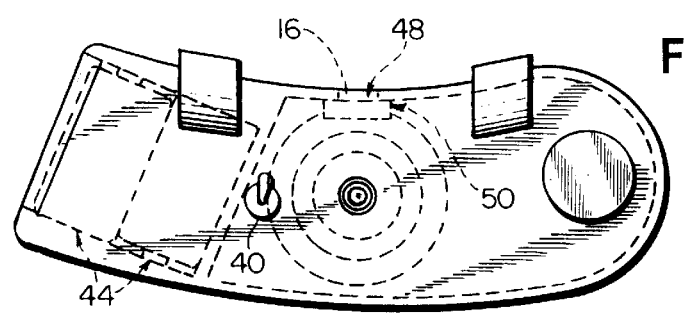
FIG. 6 is a horizontal top plan view of the preferred embodiment of FIG. 5 taken along the line 4—4 of FIG. 3.

In a preferred embodiment of the present invention, the means for distributing a fluid fire suppressant further comprises a reservoir 9, with an inlet 11 having a cap 10 and an outlet 11a having an outlet cap 38, for storing water and an electrically powered pump 12. Said cap 10 may be adapted with a means for intaking air into the water reservoir. A 6 volt miniature water pump, such as one made by Edmund Scientific Co., model 50,345, which pumps 1 pint per minute at 12 inch head is a preferred selection for use with a single nozzle discharge. For embodiments having a plurality of nozzles, an Atwood Boat Bilge Pump having a 360 gph rating at 12 volts is more than adequate. As shown in FIG. 5, these components have been arranged in a casing 6 which further contains the power source 104 for the apparatus, here two batteries 44 and a manual activation switch 108 disposed through casing penetration 40. It is contemplated that both manual and automatic flame sensing activation may be employed. A preferred feature to insure the availability of a sufficient quantity of fluid fire suppressant is to construct the casing 6 out of a translucent material where the level of fluid can be observed. Alternatively, a reservoir low level indicator may be provided. As shown in FIGS. 5 and 6, there is a separating wall 46 between the water reservoir 9 and the power source and switch.

In another preferred embodiment where the pump is positioned outside of the kettle, the pump discharge may be arranged and adapted to pass through an opening in the kettle wall.

Figure 3:
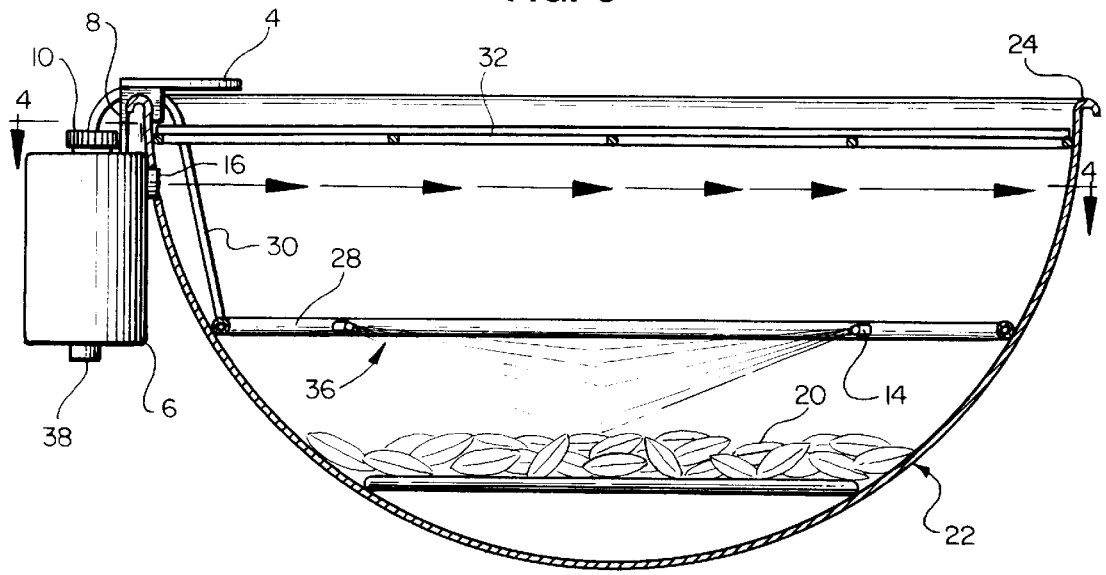
FIG. 3 is a side elevation view of the preferred embodiment of the present invention shown in FIG. 2 with the components of its means for retarding excessive flame engaged to the kettle.

As shown in FIG. 6, the casing 6 further contains the photodetector 50 which sees through an opening 48 in a wall of the casing 6. The casing 6 may be made of a ceramic material or another heat resistant material and may be supported by at least one hanger 8 which may be disposed on the upper rim 24 of the kettle 22, as shown in FIGS. 2 and 3.

Not shown in the drawing is a preferred embodiment wherein the means for activating comprises a remote transmitter and a receiver operably connected to the electrically powered pump to activate the apparatus remotely.

Figure 4:
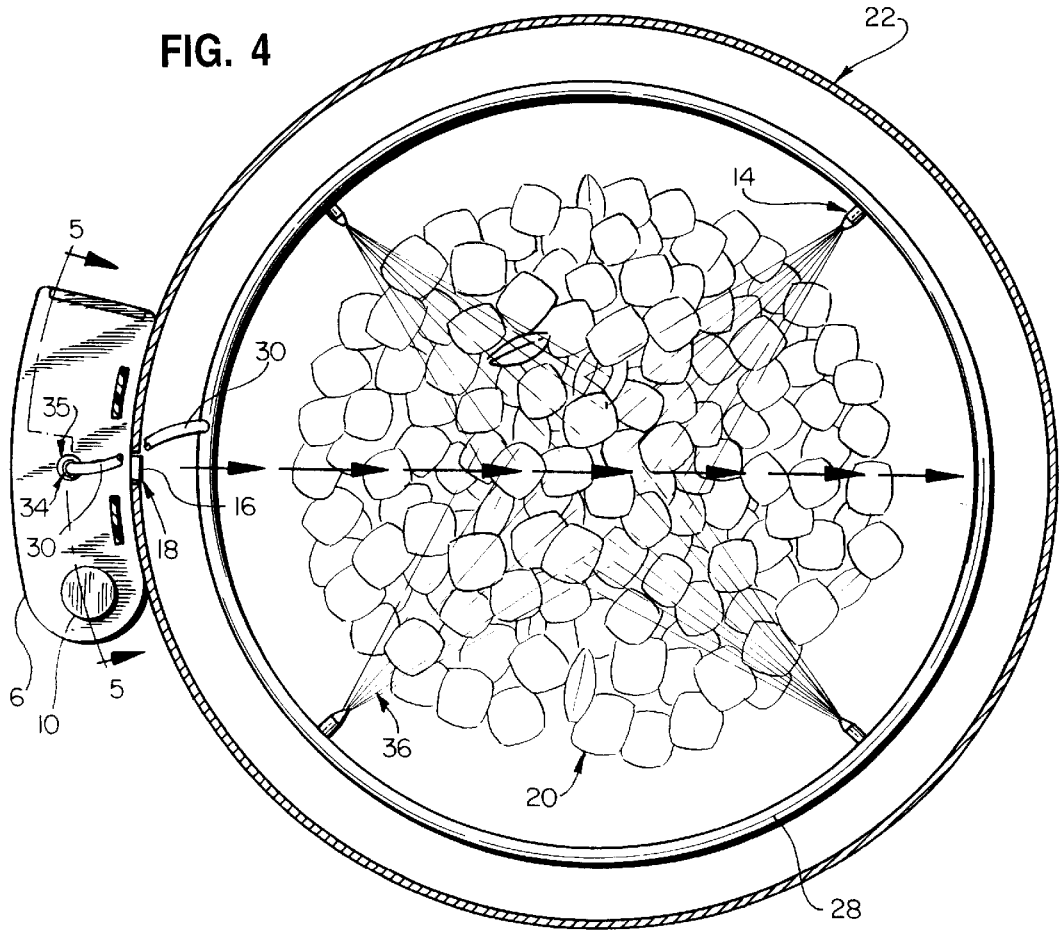
FIG. 4 is a horizontal sectional top plan view of the preferred embodiment along the line 4—4 of FIG. 3 (with the line 30 partially shown for added clarity)

Referring to FIG. 2, a preferred embodiment comprises a horizontal distribution ring 28 having a plurality of discharge nozzles 14 through which the fluid discharge 36 is disbursed, as shown in FIG. 4. Referring to FIG. 5, the supply line 30 to the distribution ring 28 may be integral with the pump discharge line 35 or a line connector 34 connecting same. The water reservoir 9 is separated from the power source by a dividing wall 46.

As an alternative to the water reservoir and pump, a preferred embodiment of this invention may comprise a supply hose connected to a source of water and an electrically powered solenoid valve.

Figure 9:
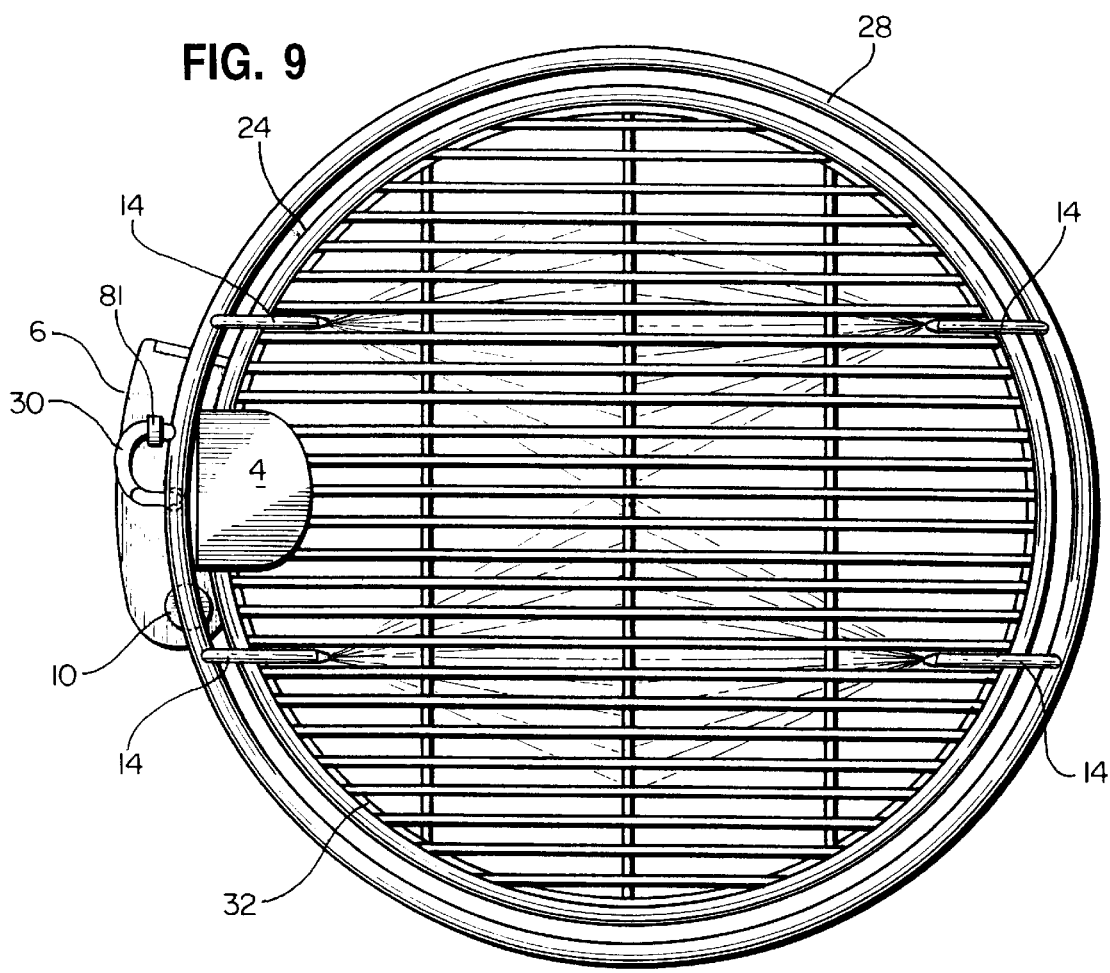
FIG. 9 is a top plan view of the preferred embodiment of the invention that is partially shown in FIG. 8.

Referring to FIGS. 8 and 9, a preferred embodiment of this invention is shown in which the horizontal distribution ring 28 is disposed outside of the kettle 22. A check valve 81 is employed on pump discharge to maintain a quantity of water said horizontal distribution ring 28 where each of the nozzles is connected to a supply line which emanates upwardly from the horizontal distribution ring, so as to maintain a supply of water in said horizontal distribution ring 28. Alternatively, maintenance of water in the horizontal distribution ring could be accomplished using a check valve integrally connected to the reservoir cap and low pressure valves on the nozzles. In such embodiments, employing a water supply line, a pressure regulated solenoid valve may be employed to maintain a charged condition in the horizontal distribution ring.

Figure 10:
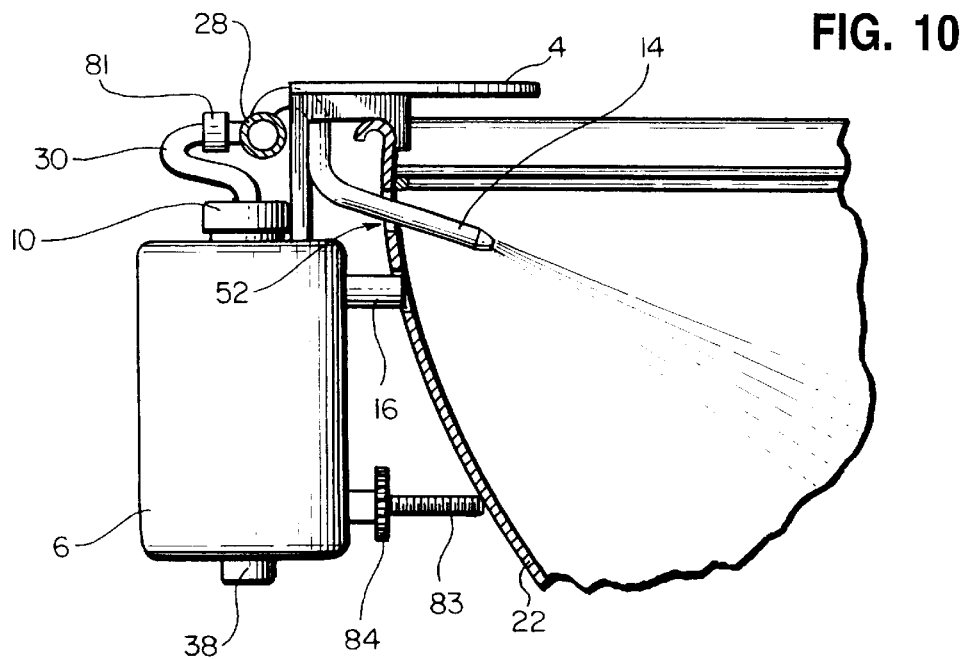
FIG. 10 ia an enlarged partial sectional elevation view illustrating a preferred embodiment of the invention showing the horizontal distribution ring disposed outside of the kettle with the nozzles emanating upwardly from the horizontal distribution ring and each nozzle entering the kettle through one of a plurality of apertures in the kettle wall.
Figure 11:
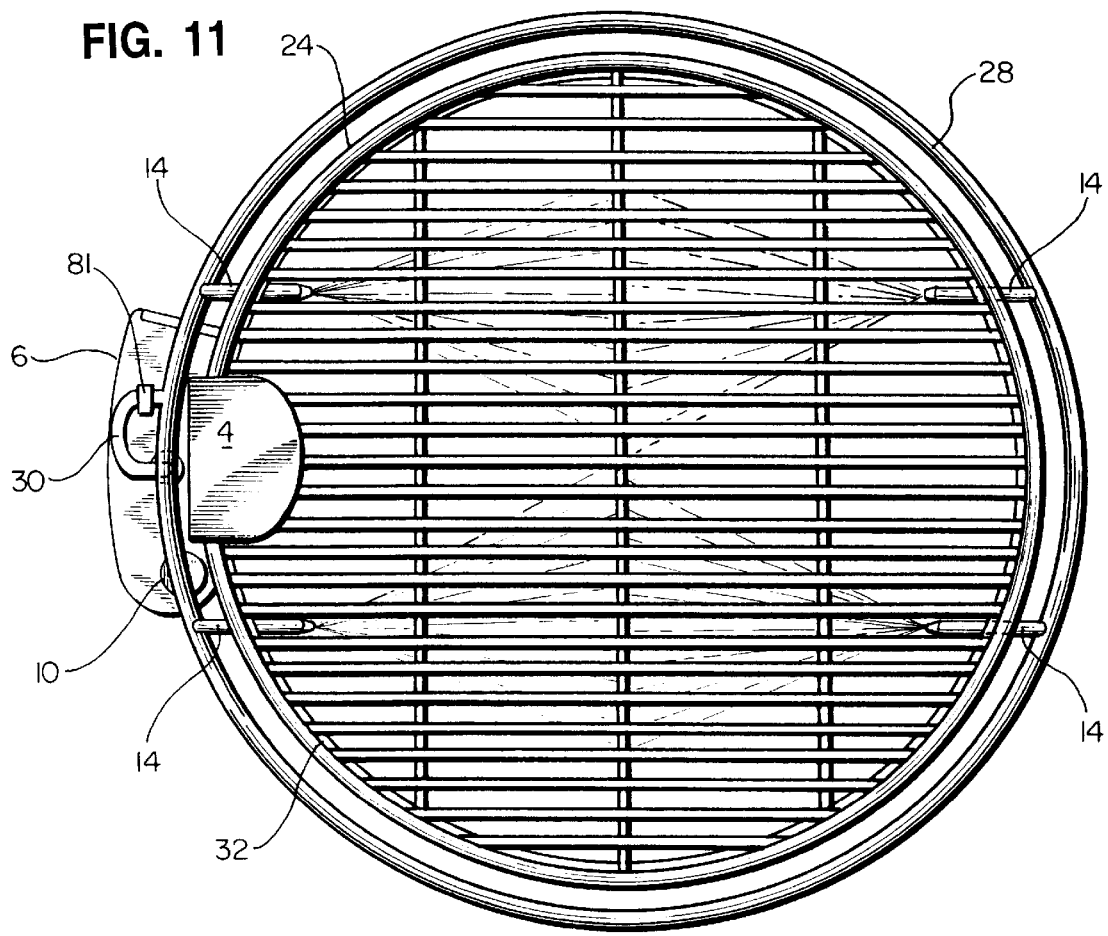
FIG. 11 is a top plan view of the preferred embodiment of the invention that is partially shown in FIG. 10.

In a preferred embodiment of the invention, the horizontal distribution ring is disposed outside of the kettle. As Shown in FIGS. 10 and 11, the kettle may have a plurality of apertures 52, each of which is arranged and adapted to provide access for one of the nozzle assemblies.

Additionally, a preferred embodiment of this invention may easily be adapted to an existing barbecue grill having a kettle with an upper rim that is arranged and adapted to hold cooking fuel such as charcoal which may be ignited in the bottom hollow thereof to produce a flame, and a grill for supporting food in a generally horizontal plane located in proximity to said upper rim and above the cooking fuel.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawing and descriptive matter in which there is illustrated preferred embodiments of the invention.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

What is claimed as being new and desired to be protected by Letters Patent of the United States is a follows:

1. A cooking enhancement system, for use with a cooking system disposed in a cooking space that employs a flame, comprising:
   means for distributing a fluid for steam generation having a distribution member disposed proximate to the cooking space and at least one discharge nozzle directed generally toward the cooking space;
   means for controllably delivering a supply of fluid to the distribution member to be discharged from the nozzle;
   a control for selectively activating the delivering means to deliver a supply of fluid, the control including means for sensing light being optically accessible to and operably responsive to the light from a flame produced during the cooking process for indicating a flame condition, timer means for intermittently indicating a desired spray condition, and switch means operatively connected to the sensing means and the timer means for activating the delivering means responsive to a flame condition and a desired spray condition to periodically develop a burst of spray to steam a product being cooked by the cooking system.

2. The cooking enhancement system of claim 1, wherein the flame arises from beneath a cooking surface.

3. The cooking enhancement system of claim 1, wherein the distribution member is generally horizontal and disposed outside of the cooking space, and further comprising means for maintaining a quantity of water in said generally horizontal distribution member.

4. The cooking enhancement system of claim 1, wherein the means for distributing a fluid provides flame suppression and the at least one discharge nozzle is directed generally toward the flame.

5. The cooking enhancement system of claim 1, wherein the means for sensing light is optically accessible to and operably responsive to the light from an excessive flame produced during the cooking process for indicating an excessive flame condition, and the switch means operatively connected to the sensing means and the timer means for activating the delivering means responsive to at least one of an excessive flame condition and a desired spray condition to douse an excessive flame and to periodically develop a burst of spray to steam a product being cooked by the cooking system.

6. The cooking enhancement system of claim 5, wherein the distribution member is generally horizontal and disposed outside of the cooking space, and further comprising means for maintaining a quantity of water in said generally horizontal distribution member.

7. The cooking enhancement system of claim 1, wherein the timer means includes means for adjusting the time delay between flame detection and initial discharge of fluid.

8. The cooking enhancement system of claim 1, wherein the timer means includes means for selecting a plurality of time intervals between spray times.

9. The cooking enhancement system of claim 8, wherein the timer means includes a selector switch for selectively connecting one of a plurality of resistors to a timer circuit, the resistors having different values corresponding to the time intervals.

10. The cooking enhancement system of claim 1, wherein the timer means includes means for determining duration of spray time.

11. The cooking enhancement system of claim 1, wherein the timer means includes an automatic steam setting having a predetermined duration of spray time and a predetermined time interval between sprays.

12. The cooking enhancement system of claim 10, wherein the timer means includes a potentiometer operatively connected to a timer circuit for varying duration of spray time.

13. The cooking enhancement system of claim 1, wherein the timer means includes a first timer circuit for determining interval between spray times and a second timer circuit for determining duration of spray time.

14. The cooking enhancement system of claim 12, wherein the timer means includes a potentiometer operatively connected to a timer circuit for varying duration of spray time.

15. The cooking enhancement system of claim 12, wherein the timer means includes a selector switch for selectively connecting one of a plurality of resistors to a timer circuit, the resistors having different values corresponding to the time intervals.

16. The cooking enhancement system of claim 1, wherein the delivering means comprises a pump operatively connected between a fluid reservoir and the distribution member.

17. The cooking enhancement system of claim 1, wherein the delivering means comprises a high pressure water supply line operatively connected to the distribution member.

18. A cooking enhancement system, for use with a cooking system disposed in a cooking space that employs a flame, comprising:
   means for distributing a fluid for flame suppression and steam generation having a distribution member disposed proximate to the cooking space and at least one discharge nozzle directed generally toward the flame;

means for controllably delivering a supply of fluid to the distribution member to be discharged from the nozzle;

a control for selectively activating the delivering means to deliver a supply of fluid, the control including means for sensing light being optically accessible to and operably responsive to the light from an excessive flame produced during the cooking process for indicating a flame condition, timer means for intermittently indicating a desired spray condition, and switch means operatively connected to the sensing means and the timer means for activating the delivering means responsive to a flame condition and a desired spray condition to douse an excessive flame and periodically develop a burst of spray to steam a product being cooked by the cooking system.

19. The cooking enhancement system of claim 17, wherein the distribution member is generally horizontal and disposed outside of the cooking space, and further comprising means for maintaining a quantity of water in said generally horizontal distribution member.

20. The cooking enhancement system of claim 18, wherein the cooking system comprises a barbecue grill that has a kettle with an upper rim that is arranged and adapted to hold cooking fuel which may be ignited in the bottom hollow thereof to produce a flame and a grill for supporting food in a generally horizontal plane located in proximity to said upper rim and above the cooking fuel, and the generally horizontal distribution member is disposed outside of the kettle.

* * * * *